United States Patent
Gardner et al.

(10) Patent No.: US 9,562,519 B1
(45) Date of Patent: Feb. 7, 2017

(54) ENERGY CAPTURE FROM ELECTRICAL POWER DISTRIBUTION LINES

(71) Applicant: Amazon Technologies, Inc., Reno, NV (US)

(72) Inventors: Brock Robert Gardner, Seattle, WA (US); Michael Phillip Czamara, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 968 days.

(21) Appl. No.: 13/864,175

(22) Filed: Apr. 16, 2013

(51) Int. Cl.
  *F03G 1/08* (2006.01)
  *H02J 9/04* (2006.01)
  *H02K 7/18* (2006.01)

(52) U.S. Cl.
  CPC . *F03G 1/08* (2013.01); *H02J 9/04* (2013.01); *H02K 7/1853* (2013.01)

(58) Field of Classification Search
  CPC ........ H02M 3/22; H02K 33/00; H02K 7/1853; F03G 1/08; H02J 9/04
  See application file for complete search history.

(56) References Cited

U.S. PATENT DOCUMENTS

| | | | |
|---|---|---|---|
| 5,386,359 A * | 1/1995 | Nochi | H02M 3/33561 323/282 |
| 6,769,323 B2 | 8/2004 | Barreiro | |
| 7,973,420 B2 | 7/2011 | Scott | |
| 2002/0101746 A1* | 8/2002 | Loef | H02M 1/4258 363/71 |
| 2009/0003373 A1* | 1/2009 | Morrissey | H04L 12/10 370/445 |
| 2012/0020117 A1* | 1/2012 | Arnold | H01F 29/10 363/15 |
| 2012/0313380 A1 | 12/2012 | Ogaz | |
| 2013/0285491 A1* | 10/2013 | Kuznetsov | H02P 25/22 310/71 |

OTHER PUBLICATIONS

U.S. Appl. No. 14/733,813, filed Jun. 8, 2015, Peter George Ross.

* cited by examiner

*Primary Examiner* — Zeev V Kitov
(74) *Attorney, Agent, or Firm* — Robert C. Kowert; Meyertons, Hood, Kivlin, Kowert & Goetzel, P.C.

(57) ABSTRACT

An energy capture system includes a transducer element and an energy storage device. The transducer element moves in response to current in one or more conductors in a set of electrical power lines. The energy storage device accumulates mechanical energy from movement of the transducer element.

26 Claims, 5 Drawing Sheets

ENERGY CAPTURE FROM ELECTRICAL POWER DISTRIBUTION LINES

BACKGROUND

A typical commercial or industrial building includes electrical power distribution systems that distribute power from one place to another within the building. In facilities having a substantial number of electrical systems, such as computing facilities, a large amount of electrical power is required to operate the facility. In addition, the electrical power is distributed to a large number of locations spread throughout the computer room (e.g., many racks spaced from one another, and many servers in each rack). A network of cabling, bus bars, power connectors, and power distribution units, may deliver the power to numerous specific components in the facility.

Commercial and industrial buildings often include components and systems to provide back-up power to electrical systems in the event of a failure of components or systems in a primary electrical power system. Providing full redundancy of electrical power may, however, be costly both in terms of capital costs (in that in may require a large number of expensive switchboard, UPSs, and PDUs, for example) and in terms of costs of operation and maintenance. In addition, some facilities do not provide redundant power for cooling systems.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Systems and methods for capturing energy from electrical power lines are disclosed. According to one embodiment, an energy capture system includes two or more transducer elements and an energy storage device. The transducer elements oscillate in response to alternating current in a pair of conductors in a set of electrical power distribution lines. Current in one of the conductors in the pair is in a different phase from that of the other of the conductors in the pair. The energy storage device accumulates mechanical energy from oscillations of the transducer elements and stores energy combined from the transducer elements.

According to one embodiment, an energy capture system includes a transducer element and an energy storage device. The transducer element moves in response to current in one or more conductors in a set of electrical power lines when current in one of the conductors in the set is in a different phase from that of at least one other of the conductors in the set. The energy storage device accumulates mechanical energy from movement of the transducer element.

According to one embodiment, a method of capturing energy from electrical power distribution lines includes receiving mechanical energy from elements that are moving in response to alternating current through one or more conductors in a set of electrical power distribution lines. Current in one of the conductors in the set is in a different phase from that of at least one other of the conductors in the set. The mechanical energy is stored. In some embodiments, mechanical energy from the elements is stored in a common storage device.

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "rack computing systems" means a computing system that includes one or more computing devices mounted in a rack.

As used herein, "reserve power" means power that can be supplied to an electrical load upon the failure of, or as a substitute for, primary power to the load.

As used herein, "room" means a room or a space of a building. As used herein, "computer room" means a room of a building in which computing devices, such as rack-mounted servers, are operated.

As used herein, a "space" means a space, area or volume.

As used herein, a "transducer element" means an element or device that transforms, either alone or in combination with other elements, one form of energy into another form of energy. For example, a transducer may transform electrical energy into mechanical energy.

In some embodiments, an energy capture system includes a transducer element(s) and an energy storage device. The transducer element(s) moves in response to varying current in conductors in a set of electrical power distribution lines. The energy may be stored or used on a continuous basis.

In some embodiments, transducer elements in a set of energy capture devices oscillate in response to alternating current in a pair of conductors set of electrical power distribution lines. An energy storage device accumulates mechanical energy from oscillations of the transducer elements.

Figure 1:
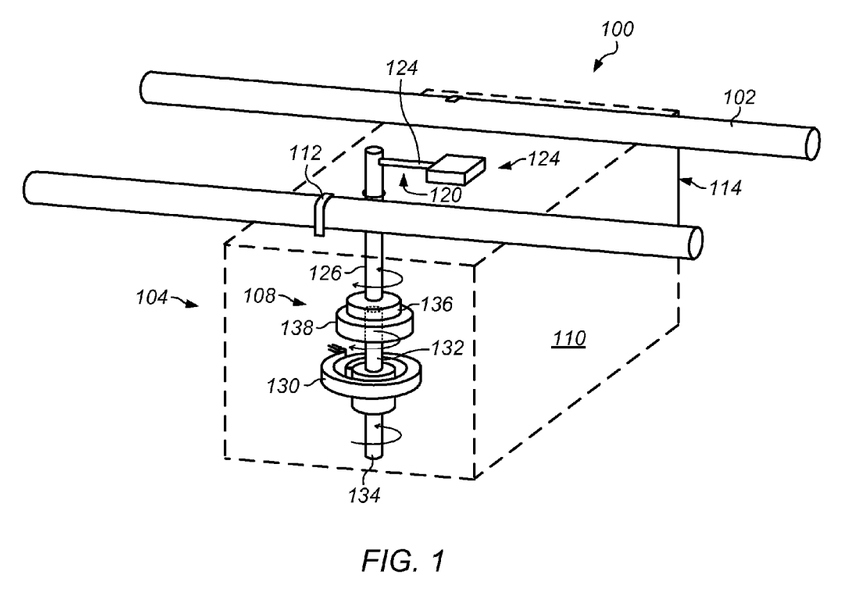
FIG. 1 illustrates one embodiment of a system for capturing energy from current in a pair of conductors in a set of electrical power lines.

FIG. 1 illustrates one embodiment of a system for capturing energy from current in a pair of conductors in a set of electrical power distribution lines. System 100 includes a pair of conductors 102 and energy capture system 104. Conductors 102 may be conductors in a set of electrical power lines. Conductors 102 may carry alternating current supplied from a power distribution system to one or more electrical loads. Current in one of conductors 102 may be out of phase with the current carried in the other one of conductors 102. For example, current in one of conductors 102 may be 180 degrees out of phase with the current in the other one of conductors 102.

In certain embodiments, conductors 102 are arranged in the form of a coil at the location of the energy capture system. The coil may be arranged to produce motion in transducer element 106 when current is passed through the coil.

Energy capture system 104 includes transducer element 106, mechanical energy storage device 108, and housing 110. Housing 110 includes clip 112. Clip 112 may be used to attach energy capture system 104 to conductors 102. Energy capture system 104 may be attached such that response element 106 is in gap 114 between conductors 102.

Transducer element 106 includes rocker 120 and magnet 122. Rocker 120 includes rocker arm 124 and rocker shaft 126. Interaction of magnet 122 with magnetic fields produced by current in conductors 102 may cause rocker 120 to move in response to changes in electrical current passing through the conductors 102. When alternating current is passed through conductors 102, rocker arm 124 may move back and forth in an oscillating manner between conductors 102. In certain embodiments, a spring (for example a torsion spring) biased rocker 120 into a home position. The home position may be equidistant from conductors 102, with rocker arm 124 running parallel to conductors 102, such as shown in FIG. 1.

Mechanical energy storage device 108 includes spring 130, spring-winding shaft 132, and output shaft 134. The outside end of spring 130 may be secured to housing 110 or otherwise fixed with respect the moving parts of the device. Spring-winding shaft 132 is coupled to rocker shaft 126 by way of ratchet mechanism 136 and gearbox 138. Movement of rocker shaft 126 may drive spring-winding shaft 132.

Ratchet mechanism 136 may be arranged such that movement of rocker shaft 126 in only one direction (for example, clockwise only) drives spring-winding shaft 132. Thus, as rocker 120 oscillates back and forth in response to changes in current in conductors 102, rocker shaft 126 may periodically advance spring-winding shaft 132 (for example, in the direction of arrow 140 shown in FIG. 1.) Rotation of spring-winding shaft 132 may wind spring 130, thereby storing mechanical energy transferred from transducer element 106 in spring 130.

Gearbox 138 may include a set of gears that establish the ratio of angular motion in rocker shaft 126 relative to spring-winding shaft 132. In some embodiments, numerous rotations or oscillations of the transducer element produce a single revolution of spring-winding shaft 132.

Output shaft 134 is connected to spring 130 by way of clutch mechanism 142. Clutch mechanism 142 operates to selectively couple output shaft 134 with spring 130. During an accumulation phase of operation of mechanical energy storage device 108, output shaft 134 may be disengaged from spring 130. Once spring 130 has been wound by spring winding shaft 132 to a predetermined amount, mechanical energy storage device 108 may enter into a release phase in which clutch mechanism 142 engages output shaft 134 with spring 130. Spring 130 may unwind, releasing energy that has been stored in spring 130 into output shaft 134. In some embodiments, clutch mechanism 142 decouples spring 130 from spring-winding shaft 132 during the release phase.

In some embodiments, mechanical energy storage device 108 alternates between an accumulation phase and a release phase. During each accumulation phase, spring 130 is wound by oscillations of transducer element 106. During each release phase, energy is transferred from spring 130 into output shaft 134. Energy from output shaft 134 may be used to transfer energy to a second storage device. In some embodiments, the output from multiple energy capture devices is combined in a single, aggregate storage device. In one embodiment, the aggregate storage device is a flywheel. Energy from the aggregate storage device may be used to power one or more loads. The energy may be used, for example, to provide emergency power for lights in a building.

In some embodiments, an energy capture device is portable. Energy capture system 100 shown in FIG. 1, for example, may be carried by service personnel to a suitable location on power distribution lines 102, and clipped or clamped onto the power lines. Energy from one or more of energy capture devices may be used to provide power for maintenance operations near the location of the device.

Figure 2:
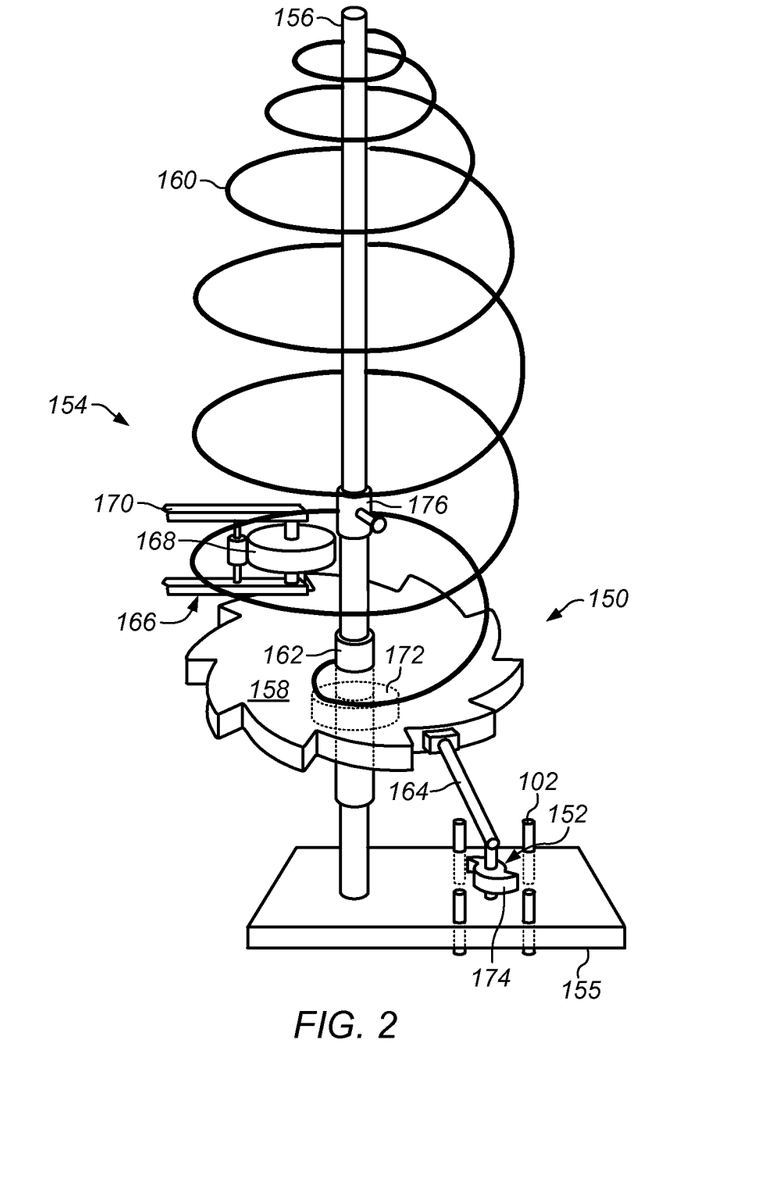
FIG. 2 illustrates one embodiment of device having a spring that can alternately store and release energy captured from alternating current flowing in a pair of conductors.

FIG. 2 illustrates one embodiment of device having a spring that can alternately store and release energy captured from alternating current flowing in a pair of conductors. Energy capture device 150 includes transducer element 152 and mechanical energy storage device 154. Transducer element 152 and mechanical energy storage device 154 may be mounted on base 155.

Mechanical energy storage device 154 includes spindle 156, ratchet wheel 158, spring 160, spring-winding collar 162, and ratchet wheel drive arm 164. Spring 160 may alternately accumulate energy from transducer element 152 and release the energy to output drive wheel assembly 166. Wheels 168 of output drive wheel assembly 166 are carried on brackets 170. Brackets 170 may be in a fixed relationship with base 155.

Spindle 156 may be attached mounted on base 155. Ratchet wheel carrier 172 may be fixed with respect to base 155. Ratchet wheel carrier 172 may hold ratchet wheel 158 at a fixed height relative to base 155, so that ratchet wheel 158 maintains engagement with ratchet wheel drive arm 164, which is also at a fixed height relative to base 155. Spring-winding collar 162 may rotate on spindle 156 and slide up and down on spindle 156. Ratchet wheel 158 may be connected to spring-winding collar 162 by way of a spline. As such, spring-winding collar 162 rotates with ratchet wheel 158. Spring 160 is coupled to spindle 156 at the top end of spring 160 and spring-winding collar 162 at the bottom end of spring 160.

Transducer element 152 includes magnets 174. Interaction of magnets 174 with magnetic fields produced by current in conductors 102 may cause transducer element 152 to move (for example, oscillate or rotate) in response to changes in electrical current passing through one or more of conductors 102.

When alternating current is passed through one or more of conductors 102, transducer element 152 may move in response to magnetic fields induced by the current. Transducer element 152 may periodically actuate ratchet wheel drive arm 164 to advance ratchet wheel 158 on spindle 156 (in the embodiment shown in FIG. 2, for example, ratchet wheel 158 rotates in a clockwise direction). After each advance of ratchet wheel 156, ratchet wheel drive arm 164 may return to its home position and begin a new advancement cycle. Mechanical energy storage device 154 may include a pawl that can be selectively engaged on ratchet wheel 158 to inhibit rotation of ratchet wheel 158 in the opposite direction (in this case, counterclockwise direction).

In some embodiments, transducer element 152 includes a gearbox. In some embodiments, numerous rotations or oscillations of the transducer element may cause a single sweep of ratchet wheel drive arm 164 to advance ratchet wheel 158.

Ratchet wheel 158 is coupled via the spline so that ratchet wheel 158 rotates spring-winding collar 162 on spindle 156. As spring-winding collar 162 rotates on spindle 156, spring-winding collar 162 winds spring 160. As spring 160 is wound, mechanical energy is transferred from ratchet wheel 158 to spring 160. At the same time, increased tension on spring 160 may cause spring-winding collar 162 to move up on spindle 156. During an accumulation phase of operation of energy capture device 150, continued cycles of motion of transducer element 152 further wind spring 160, thereby storing additional mechanical energy in spring 160.

Once spring-winding collar 162 has been drawn up on spindle 156 to a predetermined height, spring-winding collar 162 may engage wheels 168 of output drive wheel assembly 166. In some embodiments, the energy from spring 160 is released into the output when spring-winding collar 162 reaches stop 176 on spindle 156.

As with the embodiments described in FIG. 1, the output from multiple energy capture devices as described in FIG. 2 may be combined in an aggregate storage device, such as a flywheel. Energy from the aggregate storage device may be used to power one or more loads. The energy may be used, for example, to provide emergency power for lights in a building.

In certain embodiments, a pawl is released from ratchet wheel 158 during the release phase of operation of the to allow ratchet wheel 158 to rotate freely as spring-winding collar 162 turns to drives wheel 168 of output drive wheel assembly 166. Once the release phase is complete, the pawl may be reengaged on ratchet wheel 158 to support another accumulation phase. In certain embodiments, a transducer element moves in a non-linear path (for example, an elliptical path) such that the transducer element avoids contact with a driven component on a return motion of the transducer element. For example, ratchet wheel drive arm 164 may be mounted such ratchet wheel drive arm 164 is in the plane of ratchet wheel 158 when ratchet wheel drive arm 164 is advancing ratchet wheel 158 on an advancing sweep of ratchet wheel drive arm 164, but move out of the plane of ratchet wheel 158 when ratchet wheel drive arm 164 is making its the return motion.

Figure 3:
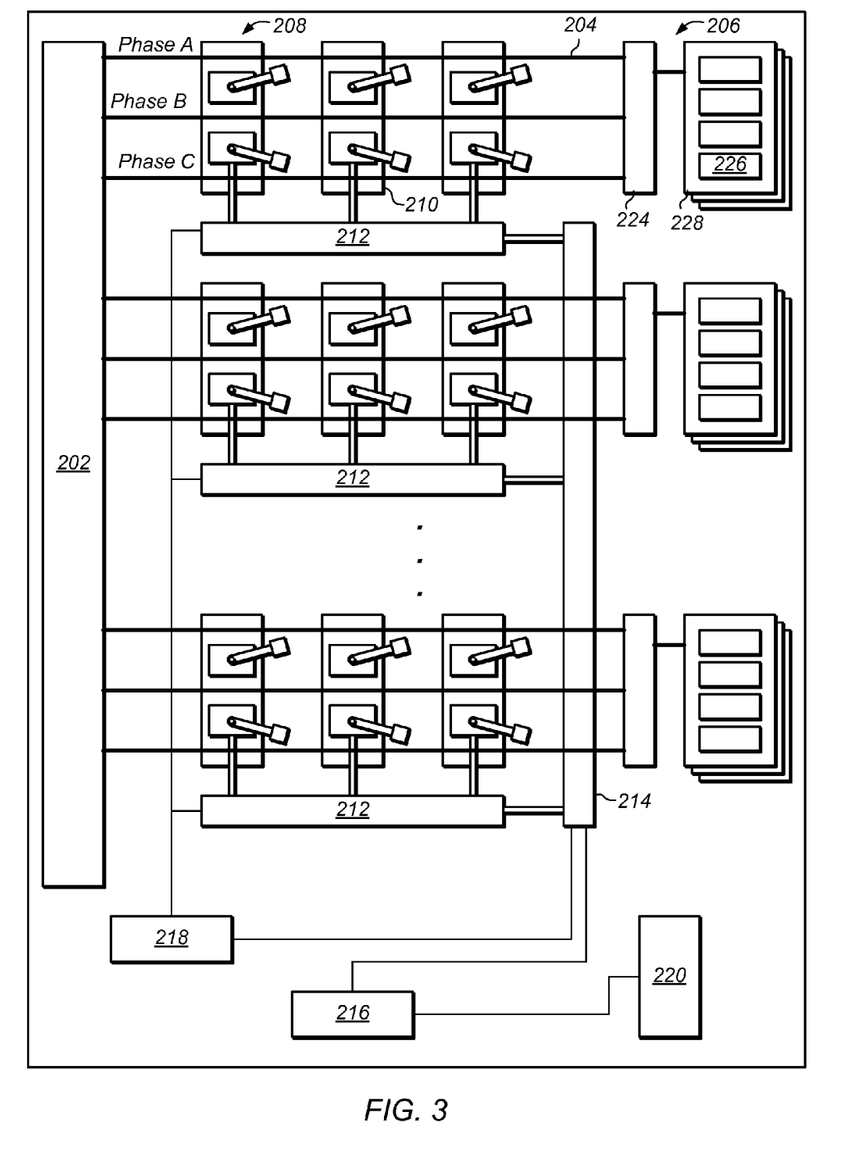
FIG. 3 illustrates one embodiment of a system for capturing energy from multiple lines of a power distribution system.

FIG. 3 illustrates one embodiment of a system for capturing energy from multiple lines of a power distribution system. Building 200 includes electrical power system 202, power distribution lines 204, loads 206, and energy capture system 208. Electrical power system 202 supplies power to loads 206 by way of power distribution lines 204. Power distribution lines may carry alternating current. In the embodiment shown in FIG. 3, loads 206 include power distribution components 224. Power distribution components 224 may supply power to computing devices 226 in racks 228. In one embodiment, building 200 is a data center and power distribution components 224 include one or more power distribution units Energy capture system 208 includes energy capture devices 210, second level storage devices 212, generator 214, electrical storage device 216, and control system 216. Energy capture devices 210 may be similar to those described above relative to FIGS. 1 and 2.

Energy capture devices may be installed on power transmission lines in various locations in a building. In a data center, for example, energy capture devices may be installed on power lines from a transformer, an uninterruptible power supply, a floor power distribution unit, a rack power distribution unit, or a generator. In certain embodiments, an energy capture device is installed between a pair of bus bars, each of which is supplying current on a different phase than the other conductor in the pair.

Electrical power system 202 may include one or more transformer, generators, switchgear apparatus, and primary power systems. In some embodiments, each primary power system includes a UPS and one or more floor power distribution units ("PDUs").

Loads 206 may each receive power from electrical power system 202. In one embodiment, each of primary power system in a facility corresponds to, and provides power to, the servers in one room in a data center. In one embodiment, each of the primary power systems corresponds to, and provides power to, one rack system in a data center.

Electrical power system 202 may be coupled to a utility feed. In certain embodiments, the utility feed is at a voltage of about 13.5 kilovolts or 12.8 kilovolts at a frequency of about 60 Hz. A UPS may provide uninterrupted power to loads (such as computing devices) in the event of a power failure upstream from the UPS.

Electrical power system 202 may include a reserve power system. The reserve power system may provide reserve power for any or all of the electrical systems supplied by one or more primary power systems. In some embodiments, a reserve power system is powered up at all times during operation of a facility The reserve power system may be passive until a failure of one or more components of the primary power system for one or more of the electrical systems in the system, at which time the reserve power system may become active.

In certain embodiments, electrical power system 202 draws power from energy capture system 208. In some embodiments, electrical power system 202 uses power generated by from energy capture system 208 as reserve power. For example, power system may draw from energy capture system 208 only in the event of a failure of a primary power system. In one embodiment, electrical power system 202 includes an automatic transfer switch that switches power from a primary power system to power from electrical storage device 216 in response to a failure in the primary power system.

Although in some of the embodiments described above, transducer elements of an energy capture device oscillate in response to variations in electrical current, transducer elements in an energy capture device may have other types of motion. In some embodiments, for example, an energy capture system includes a transducer element that rotates in one direction response to current flowing through electrical conductors.

Figure 4:
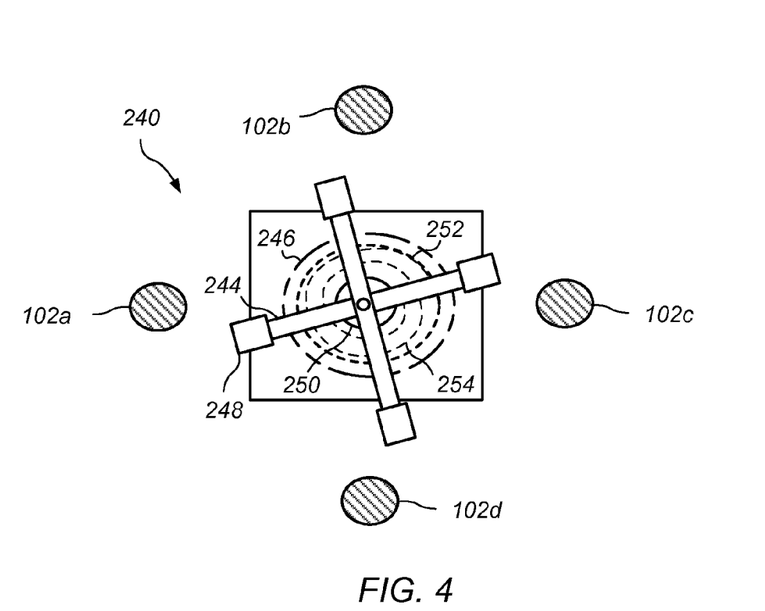
FIG. 4 illustrates one embodiment of an energy capture device including a rotating response element.

FIG. 4 illustrates one embodiment of an energy capture device including a rotating response element. System 240 includes energy capture device 242 and conductors 102a, 102b, 102c, and 102d (for clarity, only a cross section of each of conductors 102a, 102b, 102c, and 102d is shown in FIG. 4). In certain embodiments, conductors 102a, 102b, 102c, and 102d include coils. Energy capture device 242 includes rotor 244 and energy storage device 246. Rotor 244 includes magnets 248. One or more of conductors 102a, 102b, 102c, and 102d may carry alternating current. Electricity flowing through conductors 102a, 102b, 102c, and 102d may be out of phase with respect to one another. Energy storage device 246 includes gears 250 and 252 and spring 254.

As the current changes in conductors 102a, 102b, 102c, and 102d, rotor 244 rotates on the base of energy capture device 242. Gears 250 and 252 may transfer energy from rotor 244 to spring 254. Energy from spring 254 may be transferred to another storage device, combined with the output of other energy capture devices, or used to supply power to other systems, such as described above relative to FIGS. 1-3.

Figure 5:
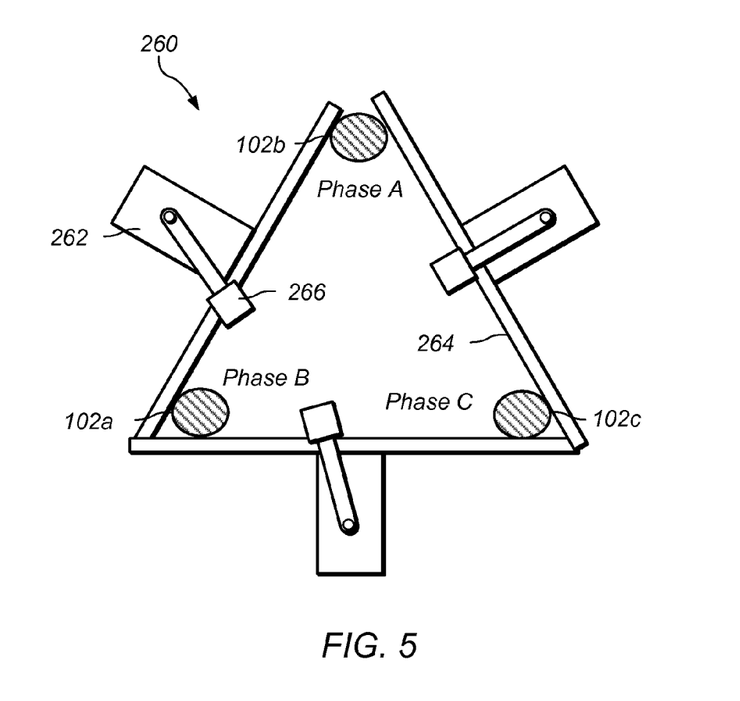
FIG. 5 illustrates one embodiment of an energy capture device for a set of power distribution lines carrying three-phase electric power.

FIG. 5 illustrates one embodiment of an energy capture device for a set of power distribution lines carrying three-phase electric power. Energy capture module 260 includes energy capture devices 262 and bracket assembly 264. Three-phase electrical power may be transmitted in conductors 102a, 102b, and 102c. Each of 102a, 102b, and 102c may have a different phase from that of the other two conductors. Energy capture devices 262 include transducer elements 266. Bracket assembly 264 may be used to mount energy capture devices 262 on conductors 102a, 102b, and 102c such that one energy capture device 262 is positioned between a pair of conductors in each phase combination (A-B, B-C, and C-A).

During use of conductors 102a, 102b, and 102c to supply power, transducer elements 266 may oscillate in response to changes in current in the respective conductor pairs. Mechanical energy from motion of transducer elements 266 may be captured and stored in energy capture devices 262, and later released (for example, for use in supplying auxiliary power in a data center.

Although in embodiments described above, transducer elements of an energy capture device rotate about a fixed axis in response to variations in electrical current in conductors, transducer elements in an energy capture device may exhibit other types of motion. Motion of a transducer element may be linear or non-linear. In certain embodiments, a transducer element of an energy capture device translates back and forth in response to variations in electrical current in conductors.

Figure 6:
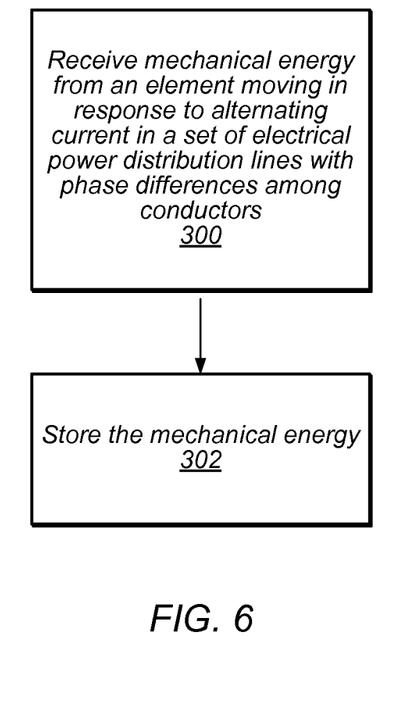
FIG. 6 illustrates one embodiment of capturing energy from electrical power lines.

FIG. 6 illustrates one embodiment of capturing energy from electrical power distribution lines. At 300, mechanical energy is received from elements that are moving in response to alternating current through one or more conductors in a set of electrical power distribution lines. Current in different conductors in the set may be in a different phase from that of at least one other of the conductors in the set. For example, each of three phase lines (for example, A, B, and C) may be shifted 120 degrees. As another example, a pair of hot lines may be shifted 180 degrees. Voltage in conductors may be any suitable voltage. In one embodiment, three-phase power is about 480 VAC. In some embodiments, the elements oscillate in response to alternating current flowing through the electrical power distribution lines.

In certain embodiments, the energy capture devices are placed at suitable locations in the power distribution system of a building. Energy capture devices may be portable. In on embodiment, service personnel carry an energy capture device to an appropriate location on a set of power distribution lines, and install the energy capture device.

At 302, mechanical energy from elements is stored. In some embodiments, energy is stored as mechanical energy (for example, by winding a spring), then released into another storage device. In some embodiments, mechanical energy from the elements is stored in a common storage device. In some embodiments, mechanical energy from many devices is combined and stored in an aggregate storage device, such as a flywheel. In some embodiments, energy from the energy capture devices is used to power a particular electrical system in a building, such as a lighting system. In certain embodiments, power from the energy transfer device may be used to provide auxiliary power for performing maintenance operations (for example, powering test equipment, power tools, or portable lighting).

In some embodiments, different devices in a set of energy capture devices release their stored energy to a common load or common storage device at different times. The difference in the timing of release may be due to differences in the timing of the alternating current in the power distribution lines on which the devices are installed, to differences in the energy storage devices, or random variations in energy capture in the devices. In certain embodiments, the release of energy from energy capture devices on power distribution lines is controlled by a programmable logic controller other control device.

In certain embodiments, energy captured from electrical power lines is stored for later in providing electrical power to operating components of specific systems in a facility, such as a lighting system or cooling system. In some embodiments, an energy capture system serves as a back-up electrical power system for a lighting system. In certain embodiments, an energy capture system includes an uninterruptible power supply.

In certain embodiments, a system draws from an energy capture system based on varying loads in the data center. For example, electrical power system 202 described above relative to FIG. 3 may draw from electrical storage device 216 when loads in the data center exceed a predetermined threshold (for example, during peak operating times).

In many of the embodiments described above, a spring is included as an energy storage device for mechanical energy. Other devices may nevertheless be included in various embodiments for storing mechanical energy captured by a transducer element. For example, in one embodiment, a transducer element may periodically tap a flywheel to accumulate mechanical energy in the flywheel.

An energy capture system may be included in various types of buildings, or in other locations (for example, vehicles or portable systems). Examples of buildings that may include devices and systems for capturing energy from electrical power lines include an office building, a factory, a medical care facility, a residence, a sports facility, or an industrial facility. Energy captured from electrical power distribution lines in a building may be used immediately or stored for later use. Examples of electrical systems that may use power previously captured from electrical power lines include robotic devices, industrial machines, hospital equipment, office equipment, and telecommunication systems.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An energy capture system, comprising:
    two or more transducer elements configured to oscillate in response to alternating current in a pair of conductors in a set of electrical power distribution lines, wherein current in one of the conductors in the pair is in a different phase from that of the other of the conductors in the pair; and
    an energy storage device configured to accumulate mechanical energy from oscillations of at least two of the transducer elements.

2. The energy capture system of claim 1, wherein at least one of the transducer elements comprises a rocker configured to rock back and forth in response to changes in current in at least one of the conductors.

3. The energy capture system of claim 1, wherein the energy storage device comprises a spring.

4. The energy capture system of claim 1, wherein at least one of the energy storage devices is configured to alternately accumulate mechanical energy from at least one of the transducer elements and release mechanical energy to a second energy storage device.

5. An energy capture system, comprising:
    one or more transducer elements configured to move in response to current in one or more conductors in a set of electrical power distribution lines when current in one of the conductors in the set is in a different phase from that of at least one other of the conductors in the set; and
    one or more energy storage devices configured to accumulate mechanical energy from movement of at least one of the transducer elements.

6. The energy capture system of claim 5, wherein at least one of the transducer elements oscillates in response to current in at least one of the conductors.

7. The energy capture system of claim 5, further comprising a one-way drive mechanism, wherein the one-way drive mechanism is configured to convert oscillation in at least one of the transducer elements into mechanical energy in at least one of the energy storage devices.

8. The energy capture system of claim 5, wherein at least one of the transducer elements continuously rotates in response to current in the one or more conductors.

9. The energy capture system of claim 5, wherein at least one of the energy storage devices comprises a spring.

10. The energy capture system of claim 5, wherein at least one of the energy storage devices comprises a flywheel, wherein at least one of the transducer elements is configured to periodically add mechanical energy to the flywheel.

11. The energy capture system of claim 5, wherein at least one of the energy storage devices is configured to alternately accumulate mechanical energy from at least one of the transducer elements and release the mechanical energy.

12. The energy capture systems of claim 5, wherein the at least one of the energy storage devices comprises a clutch mechanism configured to automatically release energy from the at least one storage device.

13. The energy capture system of claim 5, wherein the energy capture device is configured to alternately accumulate mechanical energy from at least one of the transducer elements and release the mechanical energy to a second storage device.

14. The energy capture system of claim 5, further comprising a flywheel, wherein at least one of the energy storage devices is configured to transfer energy to the flywheel.

15. The energy capture system of claim 5, further comprising a generator configured to generate electricity from energy in at least one of the energy storage devices.

16. The energy capture system of claim 15, further comprising a battery, wherein the generator is configured to transfer from at least one of the energy storage devices.

17. The energy capture system of claim 5, wherein the one or more transducer elements comprise a plurality of transducer elements, wherein the one or more energy storage devices comprise a plurality of energy storage devices, wherein at least two of the energy storage devices are configured to alternately accumulate and release energy from at least two of the transducer elements.

18. The energy capture system of claim 5, wherein at least two of the transducer elements are configured to move in response to current in the same set of power lines as one another.

19. The energy capture system of claim 5, wherein at least one of the transducer elements is configured to move in response to a current in a different set of power lines than at least one other of the transducer elements.

20. The energy capture system of claim 5, wherein at least one of the set of power lines is a set of power distribution lines in a data center.

21. The energy capture system of claim 5, wherein at least one of the energy capture devices is configured to couple to an auxiliary power system, wherein the auxiliary power system is configured to supply power to an electrical system in a data center.

22. The energy capture system of claim 5, further comprising a control system coupled to at least one of the energy storage devices, wherein the control system is configured to control release of energy from at least one of the transducer elements in the at least one energy storage device.

23. A method of capturing energy from electrical power distribution lines, comprising:
    receiving mechanical energy from two or more elements that are moving in response to alternating current through one or more conductors in a set of electrical power distribution lines, wherein current in one of the conductors in the set is in a different phase from that of the other of the conductors in the set; and
    storing the mechanical energy from at least two of the elements in a common storage device.

24. The method of claim 23, wherein at least one of the elements oscillates in response to the current through the conductors.

25. The method of claim 23, further comprising transferring at least a portion of the stored energy from a first storage device to a second storage device.

26. The method of claim 23, further comprising generating electricity from the stored mechanical energy, and supplying at least a portion of the electricity to one or more electrical systems.

* * * * *